United States Patent [19]

Leady

[11] Patent Number: 4,940,451
[45] Date of Patent: Jul. 10, 1990

[54] ADJUSTABLE GAME CALL DEVICE

[76] Inventor: Scott C. Leady, 101 Clinton, Grand Haven, Mich. 49417

[21] Appl. No.: 281,022

[22] Filed: Dec. 7, 1988

[51] Int. Cl.⁵ ............................................. A63H 5/00
[52] U.S. Cl. ................................. 446/208; 446/207; 446/202
[58] Field of Search ............... 446/202, 203, 204, 205, 446/206, 207, 208, 209; 84/410, 364, 456

[56] References Cited

U.S. PATENT DOCUMENTS

| | | | |
|---|---|---|---|
| 726,277 | 4/1903 | Fuller | 446/208 |
| 825,610 | 7/1906 | Olt . | |
| 1,484,148 | 2/1924 | Olt . | |
| 2,470,823 | 5/1949 | Luch | 46/180 |
| 2,544,370 | 3/1951 | Walther | 46/180 |
| 2,584,549 | 2/1952 | Carhart | 46/180 |
| 2,651,141 | 9/1953 | Bicocchi | 46/180 |
| 2,737,757 | 3/1956 | Liebelt | 46/179 |
| 3,020,675 | 2/1962 | Boecker | 446/208 |
| 3,579,903 | 5/1971 | Stewart | 446/208 |
| 4,030,241 | 6/1977 | Gallagher | 46/180 |
| 4,151,678 | 5/1979 | Robertson | 46/180 |
| 4,221,075 | 9/1980 | Gallagher | 46/178 |
| 4,612,001 | 9/1986 | Burnham | 446/208 |

OTHER PUBLICATIONS

Kelly Kallers product literature entitled "Pro Grunter Deer Call".

Primary Examiner—Mickey Yu
Assistant Examiner—Sam Rimell
Attorney, Agent, or Firm—Price, Heneveld, Cooper, DeWitt & Litton

[57] ABSTRACT

A game call device has a vibrating reed that is externally adjustable by an adjustment member extending through an opening in the resonance chamber. An air closure baffle is positioned over the adjustment opening and is slidable with the adjustment member to prevent air movement through the opening. Optional resonance tubes may be applied to the device to alter the volume of the resonance chamber to increase the variety of game sounds that may be produced.

18 Claims, 3 Drawing Sheets

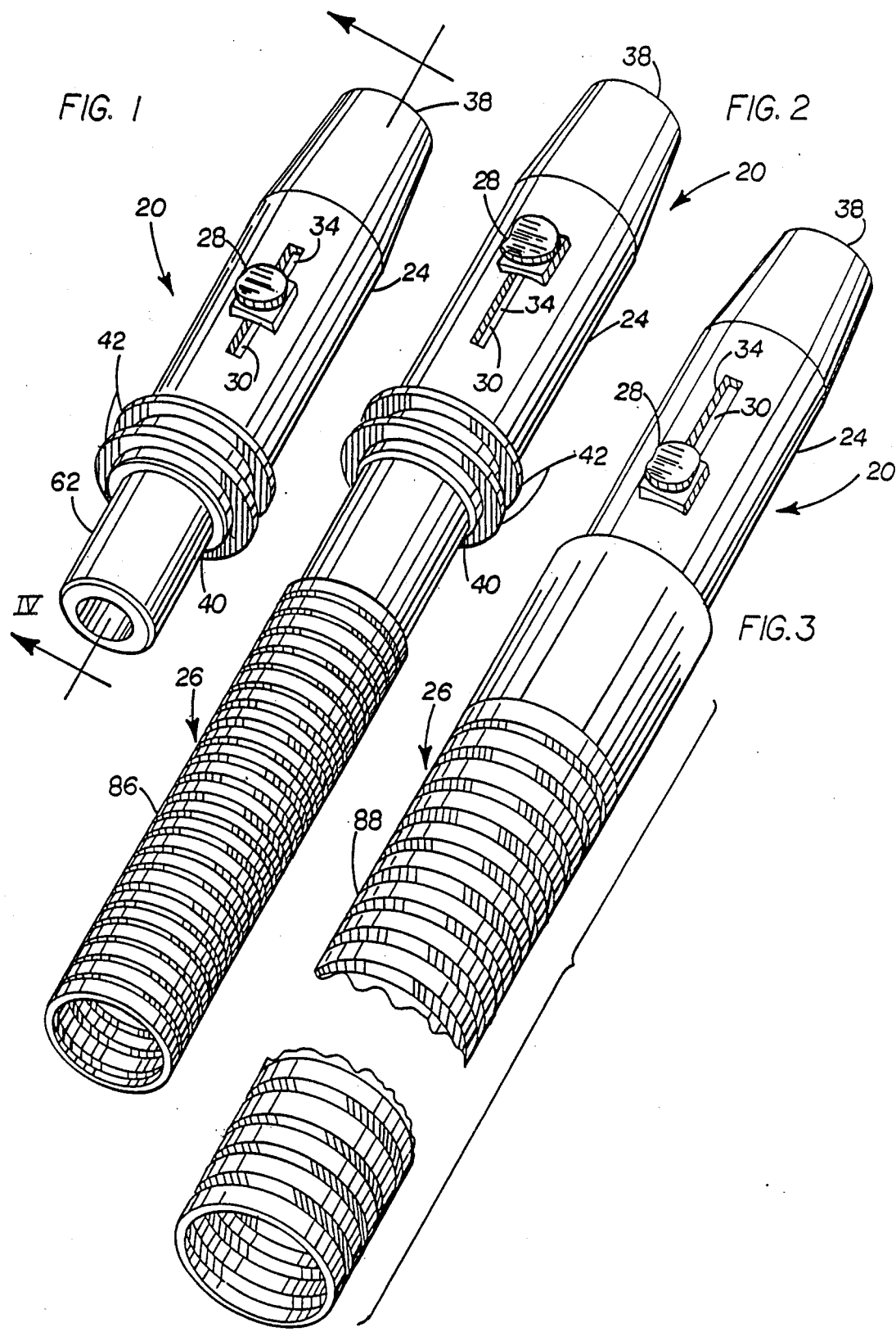

1

ADJUSTABLE GAME CALL DEVICE

BACKGROUND OF THE INVENTION

This invention relates to a game call device, and in particular, to a device capable of simulating the sounds of many different animals.

Calls have been developed for use by an operator, or caller, to attract game. Virtually all calls require skill and practice on the part of the caller to produce a sound made by a particular animal. Moreover, for a particular animal genus and species, such as a particular species of deer, for example, a wide range in pitch and spectral content are required to encompass age and sex variations in the sounds made by the animal. The sounds made by a fawn are different from those of a doe and both are different from those made by a buck.

An even greater range in pitch and spectral content are required to enable a caller to simulate sounds over a variety of animal genus and species. For example, a duck quack requires a relatively high pitch, while an elk call requires a much lower pitch.

Accordingly, it is an object of the invention to provide a game call device which is capable, in the hands of a skilled caller, of simulating the calls of animals varying widely in age, sex, species and genus. It is also an object of the invention to provide such as game call device which is reliable and easy to use under virtually all environmental conditions.

SUMMARY OF THE INVENTION

A game call device according to the present invention includes a reed positioned within an elongated air flow resonance chamber and adapted to vibrate in response to air flow induced in the chamber by a caller. A tuning rod extending through the resonance chamber wall is glidable in the direction of elongation of the reed and has an end portion abutting the reed to selectively vary the effective length of the reed. An air closure is provided for covering the elongated opening in the resonance chamber wall, through which the tuning rod passes, in order to accommodate the movement of the tuning rod while maintaining the sound-producing integrity of the chamber. The present invention further provides a first mounting means at an end of the resonance chamber for selectively mounting a first optional resonance tube having a first predetermined diameter in order to increase the effective volume of the resonance chamber. The invention further provides a second mounting means for selectively mounting a second optional resonance tube of a second predetermined diameter that is larger than the diameter of the first tube to increase the effective volume of the resonance chamber by an amount greater than that achieved with the first tube.

In this manner, the present invention accommodates accurate and reliable tuning of the reed without disassembly of the call device and without compromising the integrity of the resonance chamber wall. The present invention provides an even greater range of sound pitch and spectral content by allowing the user to selectively vary the size of the resonance chamber by applying either of two optional resonance tubes to an end of the resonance chamber, or, by using the call device with no resonance tube at all.

These and other related objects, advantages and features of this invention will become apparent upon review of the following specification in conjunction with the drawings.

BRIEF DESCRIPTION OF THE DRAWINGS

FIG. 1 is a perspective view of an adjustable game call device according to the present invention;

FIG. 2 is a perspective view of the game call device in FIG. 1 in combination with a first resonance tube;

FIG. 3 is a perspective view of the game call device in FIG. 1 in combination with a second resonance tube;

DESCRIPTION OF THE PREFERRED EMBODIMENT

Figure 4:
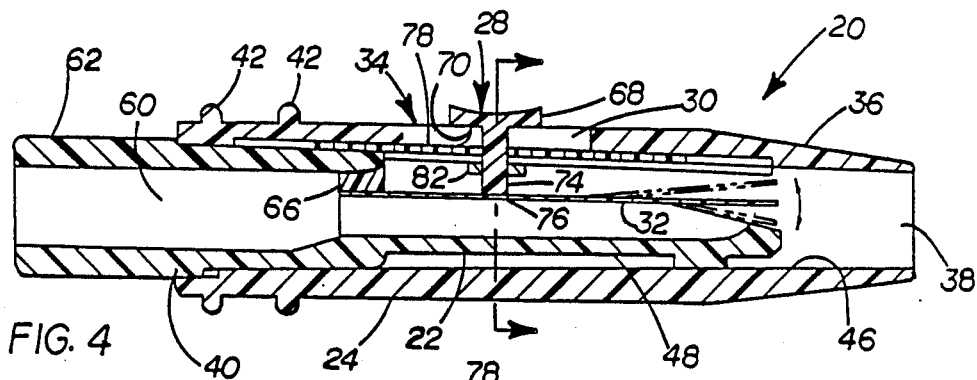
FIG. 4 is a sectional view taken along the lines IV—IV in FIG. 1.
Figure 5:
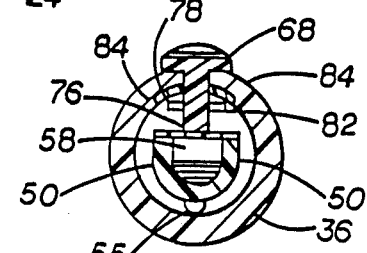
FIG. 5 is a sectional view taken along the lines V—V in FIG. 4.

Referring now specifically to the drawings, and the illustrative embodiments depicted therein, an adjustable game call device generally shown at 20 includes a reed assembly 22 positioned within an elongated cylindrical resonance chamber 24 and may optionally include one or more resonance tubes 26 in air-flow communication with the interior of resonance chamber 24. A tuning member 28 is slidably mounted to resonance chamber 24 and extends through an elongated opening 30 in the chamber wall 36. Tuning member 28 engages a reed 32 in a manner that will be described in greater detail below in order to vary the pitch of the sound produced by the call device. In order to close opening 30 from air flow out of chamber 24, air sealing means 34 is provided for substantially preventing air flow through opening 30.

Resonance chamber wall 36 is open at opposite ends 38 and 40 thereof. Opening 30 is elongated in the direction of elongation of chamber 24 and extends entirely through one portion of wall 36. Wall 36 includes a pair of annular shoulders 42 extending outwardly at end portion 40 for a purpose that will be explained in detail below.

Figure 6:
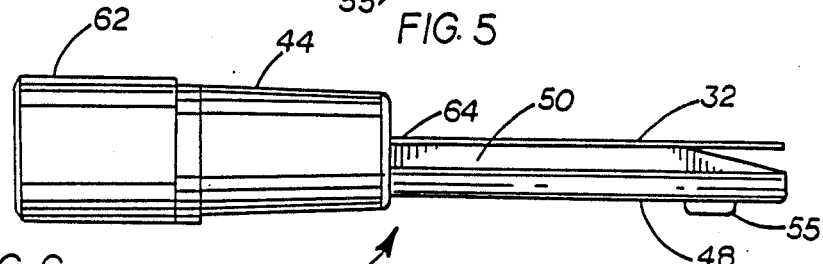
FIG. 6 is a side elevational view of a reed assembly according to the invention.

Reed assembly 22 includes a hollow cylindrical central portion 44 having an outer surface that is configured to frictionally engage a portion of inner surface 46 of resonance chamber wall 36 adjacent end portion 40 in order to fasten the reed assembly within the resonance chamber. Reed assembly 22 further includes an outer portion 62 that has an outer surface that is somewhat larger than inner surface 46 and thus protrudes outwardly of wall 36. Reed assembly 22 further includes an inner portion 48 which extends continuously from central portion 44 and is configured in cross section as a squared U-shape. Inner portion 48 includes a pair of generally parallel sidewalls 50 defining a pair of planarly aligned surfaces 52 which are flat for most of their length and terminate in a downwardly sloping forward portion 54. A bottom wall 56 interconnects lower portions of sidewalls 50 to define a resonance passage 58 which communicates with an internal cavity 60 defined by central portion 44 and outer portion 62 of the reed assembly. A support member 55 extends from bottom wall 56 and into engagement with surface 46 in order to maintain surfaces 52 parallel with wall 36. A generally flat, pliable reed 32 is fastened at one end 64 to reed assembly 22 by a wedge 66 frictionally engaging an end of cavity 60 adjacent inner portion 48. Reed 32 is thus positioned in engagement with surfaces 52 and partially covers resonance passage 58. In this manner, air moving through resonance chamber 24, across reed 32 from the right as viewed in FIG. 6, will cause reed 32 to vibrate, establishing sound waves that resonate within chamber 24 to produce an amplified sound.

Tuning member 28 includes an enlarged external portion 68 having a lower surface 70 which conforms to the shape of the outer surface of wall 36 and an upwardly-facing concave actuating surface 72, which is configured to conform to the shape of a user's finger. Tuning member 28 additionally includes an elongated tuning rod 74 extending through opening 30 perpendicular to wall 36 and terminating at an inner end portion 76. With rod 74 extending through opening 30 and surface 70 against wall 36, inner end portion 76 will engage the upper surface of reed 32. Thus, as tuning member 28 is slidably moved along resonance chamber 24, in opening 30, inner end portion 76 glides along reed 32 in the direction of elongation of the reed. Various positions of tuning member 28 may be observed by comparing the illustrations in FIGS. 4, 7 and 8. Tuning member 28 is configured to firmly engage reed 32 by inner end portion 76 and press the reed into contact with surfaces 52 without permanently creasing the reed. Because support member 55 keeps surfaces 52 parallel with wall 36, equal pressure will be exerted by the tuning member against the reed across the extent of travel of tuning member 28. In this manner, the effective length of reed 32 that is allowed to vibrate is altered by the position of tuning member 28 to vary the pitch of the sound produced by air flowing over reed 32.

Air closure means 34 includes baffle 78 in engagement with the portion of inner surface 46 that surrounds opening 30 in resonance chamber 24. Baffle 78 includes an opening 80 through which tuning rod 74 extends. A fastening means, such as push nut 82, engages tuning rod 74, to draw lower surface 70 of tuning member 28 against the outer surface of wall 36 and an upper surface of baffle 78 against the portion of surface 46 surrounding opening 30. In this manner, baffle 78 covers opening 30 and provides means for closing the opening against air movement therethrough. Inner surface 46 is notched at 84 to define a guide means to guide baffle 78 in sliding movement in the direction of elongation of resonance chamber 24. In a preferred embodiment, baffle 78 is a thin, flexible, planar film that conforms to the cylindrical configuration of surface 46 by the upward force placed on it by push nut 82. It is thus seen that baffle 78 is adapted to move in conjunction with the sliding movement of tuning member 28 to accommodate the movement of the tuning member while continuously closing the opening 30 against air passage out of the resonance chamber.

The pitch and spectral content of sound produced by the game call device 20 is influenced not only by the position of the tuning member 28 with respect to reed 32 but additionally by the volume and geometry of resonance chamber 24. The present invention provides optional resonance tubes 26 for selectively altering the volume and configuration of the resonance chamber. A first resonance tube 86, illustrated in FIG. 2, has a predetermined inner diameter selected to frictionally engage the outer surface of outer portion 62 of reed assembly 22 and has a predetermined length selected to facilitate the production of sounds of medium-size animals, such as deer and the like. The present invention additionally provides a second resonance tube 88, illustrated in FIG. 3, having a predetermined inner diameter larger than that of first resonance tube 86 and capable of being frictionally engaged with shoulder portions 42 of resonance chamber 24. Second resonance tube 88 has a predetermined length that is selected to facilitate the simulation of the sounds made by large animals, such as elk and the like. Thus, adjustable game call device 20 may be used without a resonance tube, such as illustrated in FIG. 1, or with either the first resonance tube, as illustrated in FIG. 2 or the second resonance tube as illustrated in FIG. 3.

Figure 7:
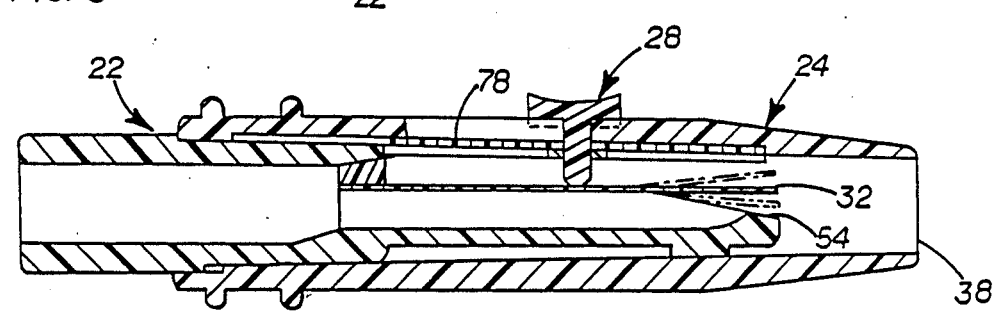
FIG. 7 is the same view as FIG. 4 with the tuning member adjusted for producing a higher pitch sound.
Figure 8:
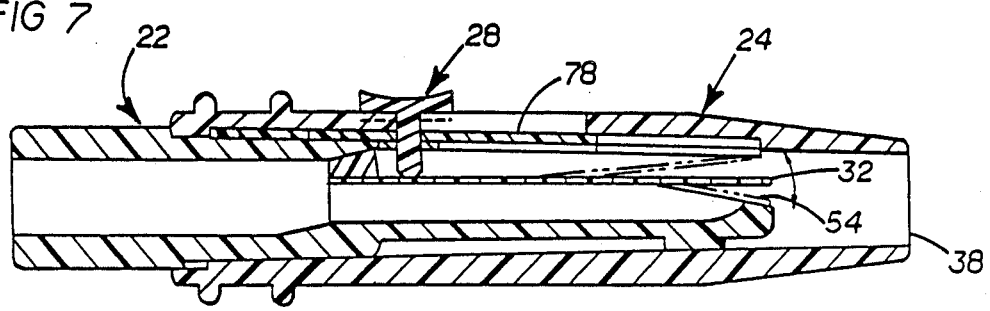
FIG. 8 is the same view as FIG. 4 with the tuning member adjusted for producing a lower pitch sound.
Figure 9:
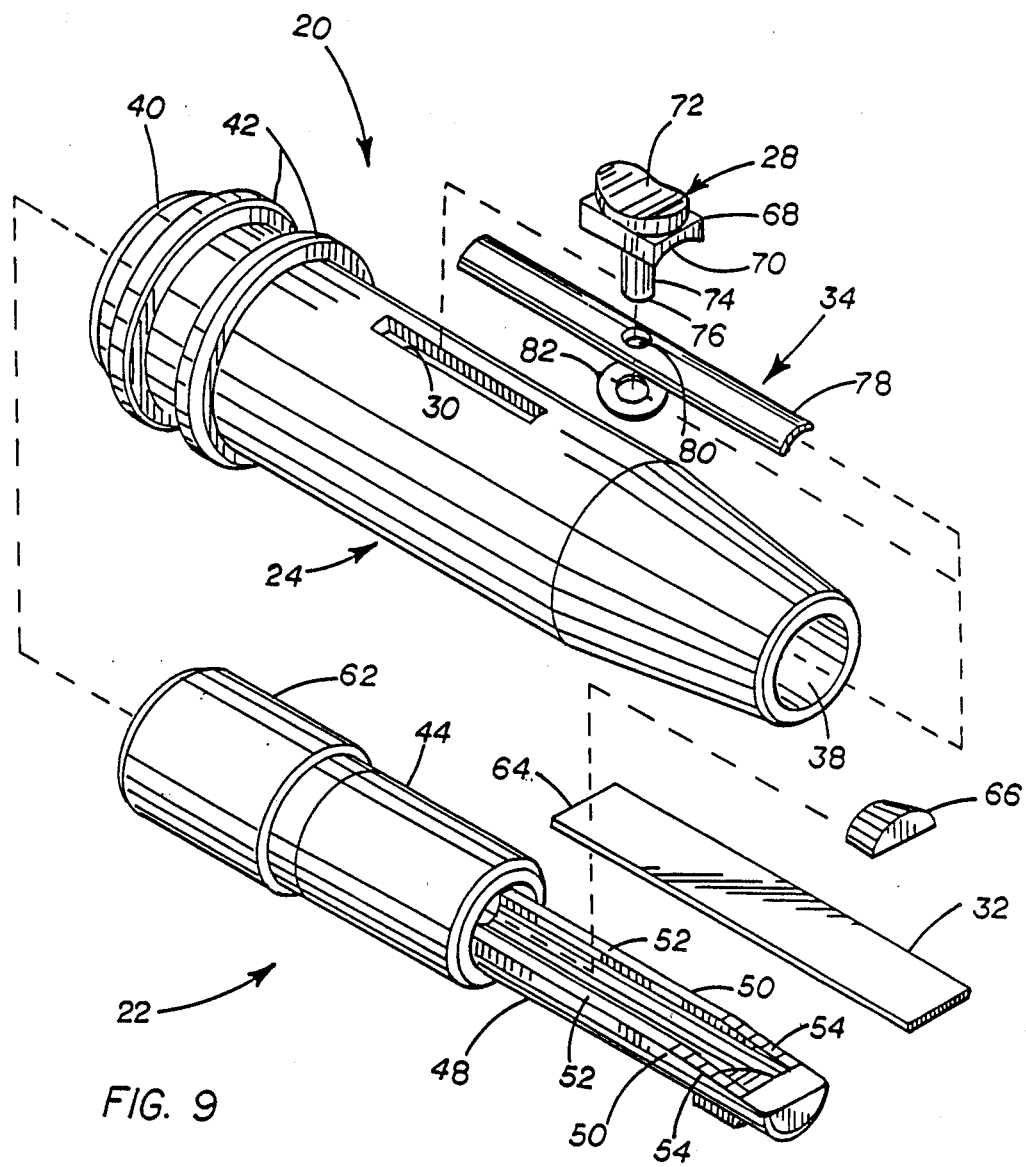
FIG. 9 is an exploded perspective view of an adjustable game call device according to the invention, illustrating the components making up a preferred embodiment.

In operation, air is moved through resonance chamber 24 from right-to-left, as viewed in FIGS. 4 and 6-8, by the caller either blowing on end 38 or drawing on end 40, or if one is used, the end of a resonance tube applied to end 40. As previously indicated, the skill of the caller will greatly influence the quality of sounds produced. To simulate the sounds of young and female members of a species, tuning member 28 is positioned as illustrated in FIGS. 4 or 7 or in an intermediate position. To produce the sounds of a full-grown male, the tuning member is slidably moved to the position illustrated in FIG. 8. The baffle 78 will slide with the tuning member in order to substantially eliminate air movement through opening 30. When it is desired to produce the sounds of ducks and other small animals, the configuration of game call device 20, as illustrated in FIG. 1 without a resonance tube, would be selected. In order to produce the call of a deer, or like medium-size animal, the first resonance tube 86 is frictionally applied to outer portion 62 of reed assembly 22, as illustrated in FIG. 2. When it is desired to produce the sounds of large animals, such as elk, the larger resonance tube 88 is applied over shoulders 42, as illustrated in FIG. 3. When game call device 20 is to be used in the configuration of FIGS. 1 and 2, a lanyard (not shown) may be applied between shoulders 42 for attaching the call device to the caller's clothing or the like.

With the exception of the resonance tubes, the baffle and the reed, the components of the illustrated embodiment are injection-molded of resinous plastic material. The reed in the illustrated embodiment is constructed of 0.007 inch Mylar sheet and baffle 78 is constructed of 0.015 inch Mylar sheet. The smaller resonance tube is manufactured from 0.875 inch corrugated polypropylene tubing having a 0.5' length and the larger resonance tubing is manufactured from 1.25 inch corrugated polypropylene tubing having a 2 foot length. Changes and modifications in the specifically described embodiments can be carried out without departing from the principles of the invention which is intended to be limited only by the scope of the appended claims, as interpreted according to the principles of patent law, including the doctrine of equivalents.

The embodiments of the invention in which an exclusive property or privilege is claimed are defined as follows.

1. An adjustable game call device comprising:
   wall means defining an elongated air flow resonance chamber;

a reed that is elongated along an axis, said reed positioned within said chamber and adapted to vibrate in response to air flowing through said chamber;

means defining an opening in said wall means elongated in a direction generally parallel said axis and generally overlying the position of said reed;

a tuning member extending through said opening and glidably mounted to said wall means by mounting means for mounting said tuning member to glide in the direction of elongation of said opening, said tuning member having a first end portion abutting said reed and an opposite end portion external of said chamber such that said first end portion is selectively positionable along the axis of elongation of the reed by movement of said opposite end portion in said direction of elongation; and air closure means for providing a substantially airtight covering of said opening in a manner that accommodates the slidable movement of said tuning member in said opening such that the pitch of said reed is adapted for adjustment without disassembly of portions of the game call device.

2. The adjustable game call device in claim 1 in which said air closure means includes a baffle substantially conforming to the internal surface of said wall.

3. The adjustable game call device in claim 2 in which said baffle is a flexible planar member.

4. The adjustable game call device in claim 2 including second mounting means for slidably mounting said baffle and including means for engaging said baffle by said tuning member such that said baffle will move in conjunction with said tuning member.

5. The adjustable game call device in claim 4 in which said tuning member opposite end portion includes an enlarged portion having an outwardly facing concave surface configured to the shape of a user's finger.

6. An adjustable game call device comprising:

wall means defining an elongated air flow resonance chamber;

a reed positioned within said chamber and adapted to vibrate in response to air flowing through said chamber;

means defining an elongated opening in said wall means generally overlying the position of said reed;

an elongated tuning member extending through said opening and glidably mounted to said wall means by first mounting means for mounting said tuning member to glide in the direction of elongation of said opening, said tuning member having a first end portion abutting said reed and an opposite end portion external of said chamber, said tuning member opposite end portion including an enlarged portion having an outwardly facing concave surface configured to the shape of a user's finger; and air closure means for providing a substantially airtight covering of said opening in a manner that accommodates the slidable movement of said tuning member in said opening such that the pitch of said reed is adapted for adjustment without disassembly of portions of the game call device, said air closure means including a baffle substantially conforming to the internal surface of said wall and second mounting means for slidably mounting said baffle to said wall means such that said baffle will move in conjunction with said tuning member, said second mounting means including means defining an opening in said baffle configured to the cross section of a mid-portion of said tuning member and fastening means engaging said tuning member and forcing said baffle against said internal wall surface to slidably mount said tuning member and said baffle against said internal wall surface.

7. The adjustable game call device in claim 6 further including guide means defined by said internal wall surface for maintaining the alignment of said baffle with said opening during sliding movement of said baffle.

8. The adjustable game call device in claim 6 in which said fastening means is a push nut.

9. An adjustable game call device comprising:

wall means defining an elongated cylindrical air flow resonance chamber having opened end portions;

a reed assembly in said chamber having an inner end portion adapted to mount a reed having a planar surface in said chamber in a manner that said reed will vibrate in a direction transverse said planar surface in response to air flowing through said chamber, said reed assembly further having a central portion adapted to engage an inner surface of said wall means to mount said reed assembly to said chamber;

a tuning member extending into said chamber and glidably mounted to said wall means by mount means for mounting said tuning member to glide with respect to said reed in a direction parallel said planar surface to adjust the effective length of the reed, said tuning member having a first end portion abutting said reed planar surface and an opposite end portion external of said chamber;

a first resonance tube of a first predetermined diameter and first mounting means for selectively mounting said first resonance tube to said chamber to selectively increase the volume of said resonance chamber by a first amount, said first mounting means comprising a portion of said reed assembly extending outwardly of said chamber wall means and having means defining a cylindrical outer surface having a diameter substantially equal to said first predetermined diameter; and a second resonance tube of a second predetermined diameter larger than said first diameter and second mounting means for selectively mounting said second resonance tube to said chamber to selectively increase the volume of said resonance chamber by a second amount.

10. The adjustable game call device in claim 9 in which said second mounting means comprises means defining a second cylindrical outer surface of said wall means having a diameter substantially equal to said second predetermined diameter.

11. The adjustable game call device in claim 10 in which said second cylindrical outer surface includes a pair of shoulders of said second predetermined diameter spaced apart in the direction of elongation of said resonance chamber.

12. An adjustable game call device comprising:

wall means defining an elongated cylindrical air flow resonance chamber having opened end portions;

a reed assembly in said chamber having an inner end portion adapted to mount a reed having a planar surface in said chamber in a manner that said reed will vibrate in a direction transverse said planar surface in response to air flowing through said chamber, said reed assembly further having a central portion adapted to engage an inner surface of said wall means to mount said reed assembly to said chamber;

a tuning member extending into said chamber and glidably mounted to said wall means by mounting means for mounting said tuning member to glide with respect to said reed in a direction parallel said planar surface to adjust the effective length of the reed, said tuning member having a first end portion abutting said reed planar surface and an opposite end portion external of said chamber;

means defining an elongated opening in said wall means through which said tuning member extends and air closure means for providing a substantially airtight covering of said opening in a manner that accommodates the sliding movement of said tuning member in said opening such that the pitch of said reed is adapted for adjustment without disassembly of portions of the game call device;

a first resonance tube of a first predetermined diameter and first mounting means for selectively mounting said first resonance tube to said chamber to selectively increase the volume of said resonance chamber by a first amount; and a second resonance tube of a second predetermined diameter larger than said first diameter and second mounting means for selectively mounting said second resonance tube to said chamber to selectively increase the volume of said resonance chamber by a second amount.

13. An adjustable game call device comprising:

wall means defining an elongated cylindrical air flow resonance chamber having opened end portions;

a reed assembly in said resonance chamber having an inner end portion adapted to mount a reed having a planar surface in said chamber in a manner that said reed will vibrate in response to air flowing through said chamber and said planar surface is parallel said wall means;

means defining an elongated opening in said wall means generally overlying the position of said reed;

an elongated tuning rod extending through said opening perpendicular to said wall means and slidably mounted to said wall means by mounting means for mounting said tuning rod to slide in the direction of elongation of said opening, said tuning rod having a first end portion abutting a selected location of said reed planar surface, the location of said planar surface abutted by said first end portion being selectable by slidably adjusting the location of said tuning rod in said opening, said tuning rod further including an enlarged opposite end portion external of said chamber and a central portion in said opening; and air closure means for providing a substantially airtight covering of said opening in a manner that accommodates the slidable movement of said rod in said opening such that the pitch of said reed is adapted for adjustment without disassembly of portions of the game call device.

14. The adjustable game call device in claim 13 in which said air closure means includes a baffle substantially conforming to the internal surface of said wall.

15. The adjustable game call device in claim 14 in which said baffle is a flexible planar member.

16. The adjustable game call device in claim 15 including mounting means for slidably mounting said baffle and means for engaging said baffle by said tuning rod such that said baffle is slidable with said tuning rod.

17. The adjustable game call device in claim 16 in which said baffle is a unitary sheet of material.

18. The adjustable game call device in claim 17 further including guide means defined by said internal wall surface for maintaining the alignment of said baffle with said opening during sliding movement of said baffle.

* * * * *

UNITED STATES PATENT AND TRADEMARK OFFICE
CERTIFICATE OF CORRECTION

PATENT NO. : 4,940,451

DATED : July 10, 1990

INVENTOR(S) : Scott Leady

It is certified that error appears in the above-identified patent and that said Letters Patent is hereby corrected as shown below:

```
Column 6, Claim 9, Line 24
              Claim 11, Line 13:
    "mount" should be --mounting--;
Column 6, Claim 12, Line 62
   Claim 14,
     After "chamber in" insert --a direction transverse
said planar surface in--; and
Column 6, Claim 12, Line 63
   Claim 14,
     After "vibrate in" delete --a direction...surface
in--.
```

Signed and Sealed this

Fourteenth Day of January, 1992

Attest:

HARRY F. MANBECK, JR.

*Attesting Officer*       *Commissioner of Patents and Trademarks*